(12) United States Patent
He

(10) Patent No.: US 8,816,605 B2
(45) Date of Patent: Aug. 26, 2014

(54) ADAPTIVE SLIDING-FREQUENCY TRIGGERING IGNITION PROCESS FOR ELECTRONIC BALLAST OF HIGH PRESSURE GAS DISCHARGE LAMP

(76) Inventor: Zheng He, Foshan (CN)

( * ) Notice: Subject to any disclaimer, the term of this patent is extended or adjusted under 35 U.S.C. 154(b) by 601 days.

(21) Appl. No.: 12/920,589

(22) PCT Filed: Oct. 21, 2008

(86) PCT No.: PCT/CN2008/001777
§ 371 (c)(1),
(2), (4) Date: Jan. 28, 2011

(87) PCT Pub. No.: WO2009/132485
PCT Pub. Date: Nov. 5, 2009

(65) Prior Publication Data
US 2011/0115393 A1  May 19, 2011

(30) Foreign Application Priority Data
Apr. 28, 2008 (CN) .......................... 2008 1 0027705

(51) Int. Cl.
*G05F 1/00* (2006.01)
(52) U.S. Cl.
USPC ........... 315/307; 315/308; 315/224; 315/291; 315/289; 315/209 R; 322/17; 322/24; 322/32

(58) Field of Classification Search
USPC ............. 315/209 R, 224, 244, 247, 289–291, 315/307, 276, DIG. 5, DIG. 7, 219, 225, 315/297, 308; 322/17, 20, 24, 29, 32, 78
See application file for complete search history.

(56) References Cited

U.S. PATENT DOCUMENTS

| | | | | |
|---|---|---|---|---|
| 6,479,949 B1 * | 11/2002 | Nerone et al. | ................. | 315/291 |
| 7,239,090 B2 * | 7/2007 | Okamoto et al. | .............. | 315/219 |
| 7,443,102 B2 * | 10/2008 | Yin et al. | ....................... | 315/193 |
| 7,589,480 B2 * | 9/2009 | Greenwood et al. | .......... | 315/307 |
| 7,911,153 B2 * | 3/2011 | Srimuang | ..................... | 315/291 |
| 8,018,181 B2 * | 9/2011 | Roman | ......................... | 315/307 |
| 8,093,834 B2 * | 1/2012 | Wilhelm et al. | .............. | 315/307 |
| 8,456,138 B2 * | 6/2013 | Lei et al. | ........................ | 322/24 |

* cited by examiner

*Primary Examiner* — Haiss Philogene

(57) ABSTRACT

An adaptive sliding-frequency triggering ignition method for electronic ballast of high pressure gas discharge lamp includes the steps of: measuring an accurate value of free oscillation frequency of the ballast load loop by using a single-chip before sliding-frequency triggering ignition, implementing safe and reliable sliding-frequency triggering ignition after calculating the initial frequency and ending frequency of sliding-frequency triggering ignition according to the accurate value. The method can safely and reliably finish sliding-frequency triggering ignition course, thus improving the parameters such as the quality, life of the high pressure gas discharge lamp electronic ballast.

7 Claims, 4 Drawing Sheets

ADAPTIVE SLIDING-FREQUENCY TRIGGERING IGNITION PROCESS FOR ELECTRONIC BALLAST OF HIGH PRESSURE GAS DISCHARGE LAMP

FIELD OF THE INVENTION

This invention is an adaptive sliding-frequency triggering ignition method for electronic ballast of high pressure gas discharge lamp.

DESCRIPTION OF PRIOR ART

High pressure gas discharge lamps (hereinafter referred to as HID lamp) usually require a more than 2500V high pressure triggering ignition impulse to allow the ionization of the tube breaking into the arc and discharging. To adopt half-bridge or full-bridge as the power drive of the DC/AC switch, the work frequency is between tens of KHz to hundred of KHz; the HID lamp is a HID lamp electronic ballast that connects to inverting bright through LC matching network, and at present, the LC series resonance method which has lower cost is usually adopted to trigger the high pressure for ignition. Refer to FIG. 1, the traditional method is that, the inverting bridge generates a starting driving square wave whose frequency is determined during designing or production, and then reduces the frequency at a certain rate or step length and slides to the ending frequency which is also determined during designing or production; it is expected that during the sliding the series resonance of the Lr, Cr//Cw loop will be enhanced gradually, and the resonant voltage on the capacitor Cr//Cw will increase gradually to finally trigger the HID lamp. During the production and use of the electronic ballast, the free oscillation frequency of the equivalent load of the inverting bridge is not fixed, but varies according to the errors of the inductive components or capacitive components as well as parameter changes due to the equivalent capacitor constituted by temperature coefficient and the type and length of the wire connecting to the tube, and the aging of the components. The free oscillation frequency of the load loop is mainly determined by Lr, Cr, and outputting wire equivalent capacitor Cw. Due to various material, technology and temperature, aging of the components, and different type and length of the outputting wires, the free oscillation frequency may vary with different material, under different use condition, and at different stage of the useful life. As a result, the sliding-frequency parameter and the free oscillation frequency of this kind of electronic ballast will not match with each other in actual operation, and the power switch of the inverting bridge will endure a hard switch mode with very large current and voltage during the process of sliding-frequency ignition, which may cause damage of the inverting bridge power switch. This is an important reason why this kind of electronic ballast of the HID lamp is likely to be damaged during ignition and is not popularized until now.

Then, how can we solve the abovementioned problem lies in the electronic ballast of the HID lamp during ignition? Now let's make an analysis from the following aspects:

The full-bridge and half-bridge driving have the same principle, so here we only take the half-bridge driving as an example, see FIG. 1. The switch tubes Q1 and Q2 are complementarily conducted with each other at an angle of 180°, but there is dead time between Q1 and Q2 to avoid direct conduction. fr refers to the free oscillation frequency of the equivalent load loop, and is mainly determined by the choking capacitor Lr, series resonant capacitor Cr and outputting wire equivalent capacitor Cw. The passive bridge arm capacitor $Cb_1=Cb_2$, and is greatly larger than the parallel value of the Cr and Cw. The high impedance of the HID lamp before it is triggered has slight influence on fr, and the buffering capacitor C1, C2 and the internal outputting capacitor of Q1, Q2 only have influence on the change of voltage and current of the loop within the dead time. fs refers to the frequency of the half-bridge switch, which is determined by oscillation driving circuit.

Switch mode 1: fs>fr.

In this case, the load of the inverting bridge is inductive, and Q1 and Q2 are switched on at zero voltage, with slight switching on wastage. When Q1 and Q2 are switched off, the current is not zero, with certain wastage. However, if the switch frequency satisfies 1.2 fr>fs>fr, the switching off current of Q1 and Q2 can be minimized to lower than half of maximum value of the loop resonant current, along with the effect of the buffering capacitor C1 and C2, the switching off wastage may be greatly reduced.

Switch mode 2: 0.5 fr<fs<fr

In this case, the load of the inverting bridge is capacitive, and Q1 and Q2 are switched off at zero voltage, with slight switching off wastage. Q1 and Q2 are switched on under the condition of the leaking voltage approaches or equals to the supplying voltage Vbus of the inverting bridge, and must endure the current of the resonant loop as well as the inverting restoring current of the diode D1 and D2 and the charging current of C1 or C2 while switching on, so the switching on wastage is high, especially when fs=0.67 fr, in such case Q1 and Q2 will be switched on while the loop resonant current is at the maximum value, so the switching on wastage is very high, which is an important reason why inverting bridge power tubes are damaged.

Therefore, in order to prevent Q1 and Q2 from being damaged during the sliding-frequency triggering ignition due to large wastage, their switching frequency must adapt to the free oscillation frequency fr of the load loop, to ensure that Q1 and Q2 are always on switch mode 1 whose load is inductive.

In theory, beside the condition of fs>fr, if the condition of fr/2K>fs>fr/(2K+1) (in which K=1, 2, 3 . . . ) is satisfied, the load of the inverting bridge is inductive too, and the situation of the switch is similar with switch mode 1.

Beside the condition of 0.5 fr<fs<fr, if the condition of [fr/(2K+2)]<fr/(2K+1)(in which K=1, 2, 3 . . . ) is satisfied, the load of the inverting bridge is capacitive too, and the situation of the switch is similar with switch mode 2.

Analysis to resonant features of the load loop:

The control of driving circuit allow inverting bridge Q1 and Q2 having the same switching on time. In the event that of the dead time is little, when fr=(2K−1)fs (in which K=1, 2, 3 . . . ), the load loop has resonant features. From frequency field analysis we can know that when K=1, the resonance is generated by the basic wave of the driving impulse and the load loop; when K=2, the resonance is generated by the cubic harmonic wave of the impulse and the load loop; . . . . The capacitor Cr of the load loop has a maximum voltage value at these resonant points. The sliding-frequency ignition just makes use of the resonant features to generate high voltage to ignite HID lamp. As a matter of fact, however, when K>4, due to the switching and conducting wastage of Q1 and Q2, as well as the wastage of the load loop itself, it accelerates attenuation of the loop current and weakens the resonant features gradually, until not sufficient to generate the high voltage for triggering ignition, so it is not adopted generally.

The principle of selecting the starting frequency f1 and ending frequency f2 of the sliding-frequency triggering ignition:

In summary, in order to prevent from being damaged during the sliding-frequency triggering ignition due to large switching wastage of Q1 and Q2 and at the same time to generate sufficient high voltage for triggering ignition, we should ensure that the load loop is inductive during the whole process of the sliding-frequency, and make sure the switching off current of Q1 and Q2 will be minimized to lower than half of the maximum value of the loop resonant current, therefore, f1 and f2 must satisfy the following conditions:

1. If using the high voltage for triggering ignition generated by the resonance of the basic wave of the driving impulse and the load loop, the condition is 1.2 fr>fs>fr.
2. If using the high voltage for triggering ignition generated by the resonance of the cubic harmonic wave of the driving impulse and the load loop, the condition is fr/2.8>fs>fr/3.
3. If using the high voltage for triggering ignition generated by the resonance of the quintic harmonic wave of the driving impulse and the load loop, the condition is fr/4.8>fs>fr/5
4. To avoid excessive outputting voltage, the sliding-frequency should gradually enhance the resonance and increase the voltage for triggering ignition, so another condition is f1>f2.
5. The closer f2 is from fr or fr/3, fr/5, the higher voltage can be generated by sliding-triggering ignition, so you can select f2 reasonably according to the supply DC voltage Vbus of the inverting output, the high voltage impulse value required for triggering HID lamp, and the wastage of the loop.

From the above analysis we can know that the precondition to safety and reliably complete the sliding-frequency triggering ignition is that before the sliding-frequency triggering ignition, the accurate frequency of the current free oscillation of the ballast load loop must be determined. This is not achievable on traditional analog control circuit or the control circuit that consists of sequence logistic digit only, but the emergence of the SCM with low price and a operating speed over 10 MPS in recent years has provide the physical condition to achieve this invention.

SUMMARY OF THE INVENTION

The purpose of this invention is to make up the insufficiency of the current electronic ballast of high pressure gas discharge lamp while igniting and provide an adaptive sliding-frequency triggering ignition method for electronic ballast of high pressure gas discharge lamp that can safety and reliably complete the process of sliding-frequency triggering ignition to improve quality, life and other parameters of the electronic ballast.

In order to achieve the abovementioned purpose, this invention provides the following technical solution: an adaptive sliding-frequency triggering ignition method for electronic ballast of high pressure gas discharge lamp, characterized in that, before the sliding-frequency triggering ignition, measure the accurate free oscillation frequency of the load loop of the ballast by SCM, and based on which to accurately calculate the starting and ending frequency of the sliding-frequency triggering ignition, and then achieve safe and reliable sliding-frequency triggering ignition.

If the circuit topology of the ballast belongs to half-bridge circuit, as shown in FIG. 2, the method to measure the free oscillation frequency is: switch off Q2 and switch on Q1 after a break, so that the load loop enters the step change transition phase under an impulse action with a scope of VAB=0.5Vbus, then the loop starts to attenuate the free oscillation, and induce an impulse of completely the same frequency with the main loop of the oscillation on the sampling winding of the inductance Lr, and rapidly start the capturing function of the central control circuit of the SCM to detect and sample the change of the storage impulse, and then switch off Q1 and the accurate free oscillation frequency of the load loop of the ballast is gained through digital processing of the SCM.

In order to ensure the accuracy and reliability of the measured free oscillation frequency of the load loop, you can switch off Q1 before executing the abovementioned method for measuring the free oscillation frequency, and switch on Q2 after a break, make sure the time in this state is sufficient enough to make the voltage on capacitor Crw VCB=−0.5Vbus and the current of the of the inductance is basically zero before starting measuring. In this case, under the same condition, it can achieve good repetition of attenuating the free oscillation of the load loop for each time executing this operation, so that accuracy and reliability of the free oscillation frequency of the load loop is ensured.

If the circuit topology of the ballast belongs to half-bridge circuit, the method to measure the free oscillation frequency can also be: switch off Q1 and switch on Q2 after a break, so that the load loop enters the step change transition phase under an impulse action with a scope of VAB=−0.5Vbus, then the loop starts to attenuate the free oscillation, and induce an impulse of completely the same frequency with the main loop of the oscillation on the sampling winding of the inductance Lr, and rapidly start the capturing function of the central control circuit of the SCM to detect and sample the change of the storage impulse, and then switch off Q2 and the accurate free oscillation frequency of the load loop of the ballast is gained through digital processing of the SCM.

In order to ensure the accuracy and reliability of the measured free oscillation frequency of the load loop, you can switch off Q2 before executing the abovementioned method for measuring the free oscillation frequency, and switch on Q1 after a break, make sure the time in this state is sufficient enough to make the voltage on capacitor Crw VCB=0.5Vbus and the current of the of the inductance is basically zero before starting measuring. In this case, under the same condition, it can achieve good repetition of attenuating the free oscillation of the load loop for each time executing this operation, so that accuracy and reliability of the free oscillation frequency of the load loop is ensured.

If the circuit topology of the ballast belongs to full-bridge circuit, as shown in FIG. 3, the method to measure the free oscillation frequency is: switch off Q2 and Q3, and switch on Q1 and Q4 after a break, so that the load loop enters the transition phase that VAB=Vbus, then the loop starts to attenuate the free oscillation, and induce an impulse of completely the same frequency with the main loop of the oscillation on the sampling winding of the inductance Lr, and rapidly start the capturing function of the central control circuit of the SCM to detect and sample the change of the storage impulse, and then switch off Q1 and Q4 and the accurate free oscillation frequency of the load loop of the ballast is gained through digital processing of the SCM.

In order to ensure the accuracy and reliability of the measured free oscillation frequency of the load loop, you can switch off Q1 and Q4 before executing the abovementioned method for measuring the free oscillation frequency, and switch on Q2 and Q3 after a break, make sure the time in this state is sufficient enough to make the voltage on capacitor Crw VCB=−Vbus and the current of the of the inductance is basically zero before starting measuring. In this case, under the same condition, it can achieve good repetition of attenuating the free oscillation of the load loop for each time executing this operation, so that accuracy and reliability of the free oscillation frequency of the load loop is ensured.

If the circuit topology of the ballast belongs to full-bridge circuit, the method to measure the free oscillation frequency can also be: switch off Q1 and Q4, and switch on Q2 and Q3 after a break, so that the load loop enters the transition phase that VAB=−Vbus, then the loop starts to attenuate the free oscillation, and induce an impulse of completely the same frequency with the main loop of the oscillation on the sampling winding of the inductance Lr, and rapidly start the capturing function of the central control circuit of the SCM to detect and sample the change of the storage impulse, and then switch off Q2 and Q3 and the accurate free oscillation frequency of the load loop of the ballast is gained through digital processing of the SCM.

In order to ensure the accuracy and reliability of the measured free oscillation frequency of the load loop, you can switch off Q2 and Q3 before executing the abovementioned method for measuring the free oscillation frequency, and switch on Q1 and Q4 after a break, make sure the time in this state is sufficient enough to make the voltage on capacitor Crw VCB=Vbus and the current of the of the inductance is basically zero before starting measuring. In this case, under the same condition, it can achieve good repetition of attenuating the free oscillation of the load loop for each time executing this operation, so that accuracy and reliability of the free oscillation frequency of the load loop is ensured.

The hardware sampling method of the free oscillation signal of the main loop of the oscillation, in addition to the sampling winding on the inductance Lr, the other method is to connect a current mutual inductance at the appropriate place of the inverting change power output circuit and the load circuit to achieve the series sampling resistance.

For the electronic ballast of HID lamp that adopts half-bridge or full-bridge as the DC/AC switching power driving and generates the high voltage for triggering ignition by making use of the resonance method, this invention adopts the abovementioned technical solution to, before sliding-frequency triggering ignition, timely and accurately measure the free oscillation frequency of the equivalent load loop and based on which to calculate the starting and ending frequency of the sliding-frequency triggering ignition as well as determining the speed or step length of the sliding-frequency, so that to safely and reliably complete the process of the sliding-frequency triggering ignition, to essentially improve the quality and life and other parameters of the electronic ballast of the HID lamp for its wide application in the field of the commercial lighting.

DETAILED DESCRIPTION OF THE EMBODIMENT

Figure 1:
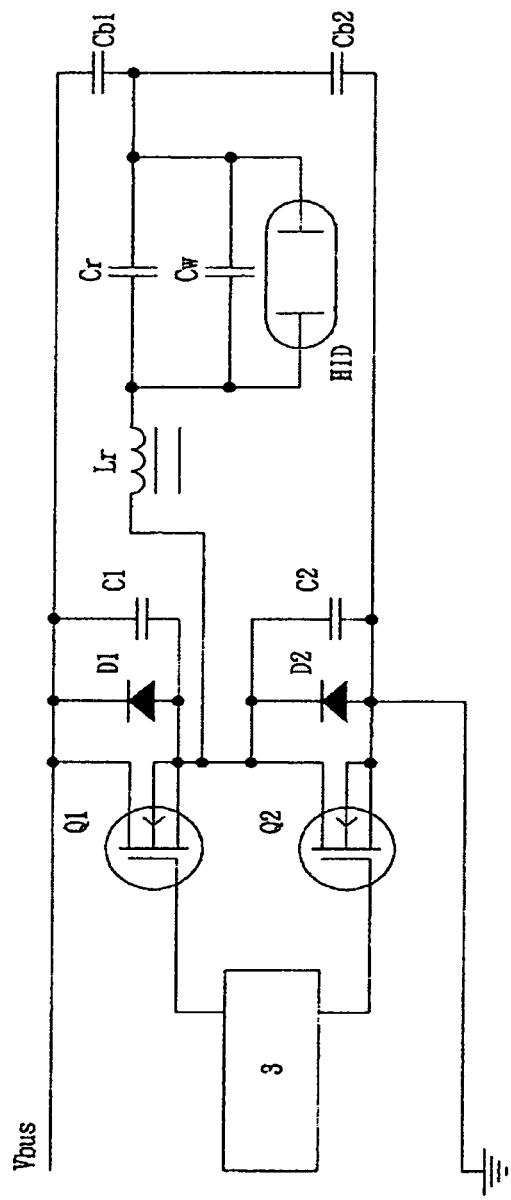
FIG. 1 is the schematic diagram of the electronic ballast of HID lamp. In the diagram, Lr is choking capacitor, Cr is resonance capacitor, Cw is the equivalent capacitor that connects the outputting wire of the HID lamp.

The circuit of this invention consists of the electronic ballast of HID lamp that includes all basic functional models, and adopts half-bridge or full-bridge DC/AC as power output. The functional models include:

Rectifying circuit (1): after inputting AC rectification, outputting impulse DC voltage Vdc to Power factor correcting circuit (2);

Power factor correcting circuit (2): making input power factor reach 1 and providing DC working voltage Vbus to inverting power output circuit (4);

Driving circuit (3): receiving control signal from the single-chip central controlling circuit (6) and sending switch control signal to inverting power output circuit (4);

Inverting power output circuit (4): as for half-bridge DC/AC power output, the components include inverting switch Q1 and Q2, freewheeling diode D1 and D2, buffering capacitor C1 and C2, receiving the switch control signal sent by driving circuit (3) and sending square wave driving signal to load circuit (5); as for full-bridge DC/AC power output, the components include inverting switch Q1, Q2, Q3 and Q4, freewheeling diode D1, D2, D3 and D4, buffering capacitor C1, C2, C3 and C4, receiving the switch control signal sent by driving circuit (3) and sending square wave driving signal to load circuit (5).

Load circuit (5): as for half-bridge DC/AC power output, the components include the choking inductance Lr with sampling winding, the series resonance capacitor Cr, the passive bridge arm capacitor Cb1 and Cb2, the lamp current sampling current mutual inductance T1, and the outputting wire equivalent capacitor Cw and HID lamp (12), in which Cb1=Cb2, and Cb1 is greatly bigger than the parallel value Crw of Cr and Cw; as for full-bridge DC/AC power output, the components include the choking inductance Lr with sampling winding, the series resonance capacitor Cr, the bridging capacitor Cb, the lamp current sampling current mutual inductance T1, and the outputting wire equivalent capacitor Cw and HID lamp (12), in which Cb is greatly bigger than the parallel value Crw of Cr and Cw;

Single-chip central controlling circuit (6): its core is a single-chip microcomputer (SCM) with an operating speed up to 10 MPS, which controls AD/AC switching of the inverting power output circuit (4) by driving circuit (3), detects the free oscillation frequency of the load circuit (5), and supervises AC input voltage, the output voltage of the Power factor correcting circuit (2), the current and voltage of HID lamp (12), the temperature of the ballast, and other status control;

Resonance loop sampling circuit (7): it connects to the winding Lr1 on the chocking inductance Lr of the load circuit (5), and the sampling signal is sent to the single-chip central controlling circuit (6);

Lamp voltage sampling circuit (8): it samples the voltages at the two ends of the HID lamp (12) and sends them to the single-chip central controlling circuit (6);

Low-voltage power supply circuit (9): it generates +5V and +15V DC voltage and provides to Power factor correcting circuit (2), single-chip central controlling circuit (6) and driving circuit (3).

Figure 2:
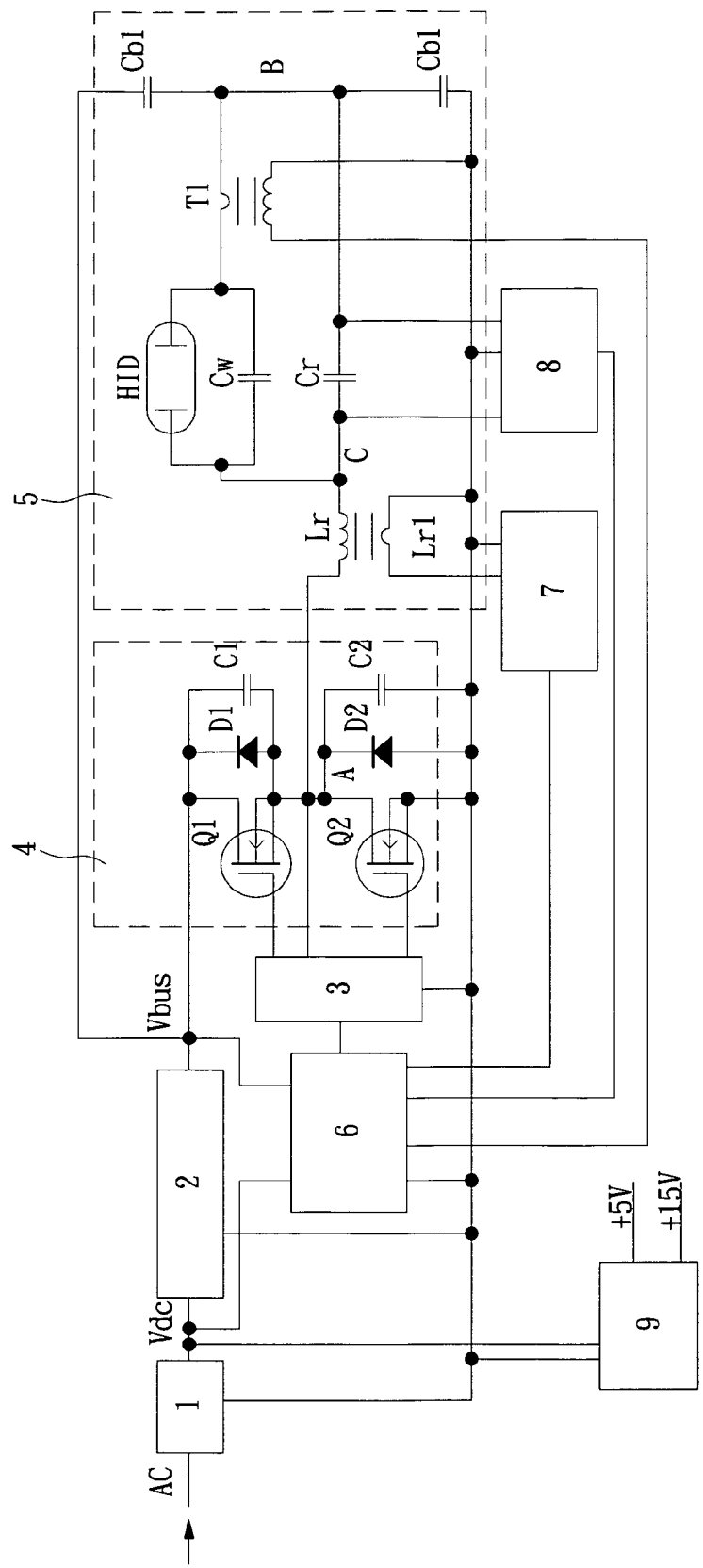
FIG. 2 is the schematic diagram of the electronic ballast of HID lamp that adopts half-bridge DC/AC as power output and includes all basic functional models. In the diagram, Cb1=Cb2, Crw=Cw//Cr, and Cb1 is greatly bigger than Crw.
Figure 3:
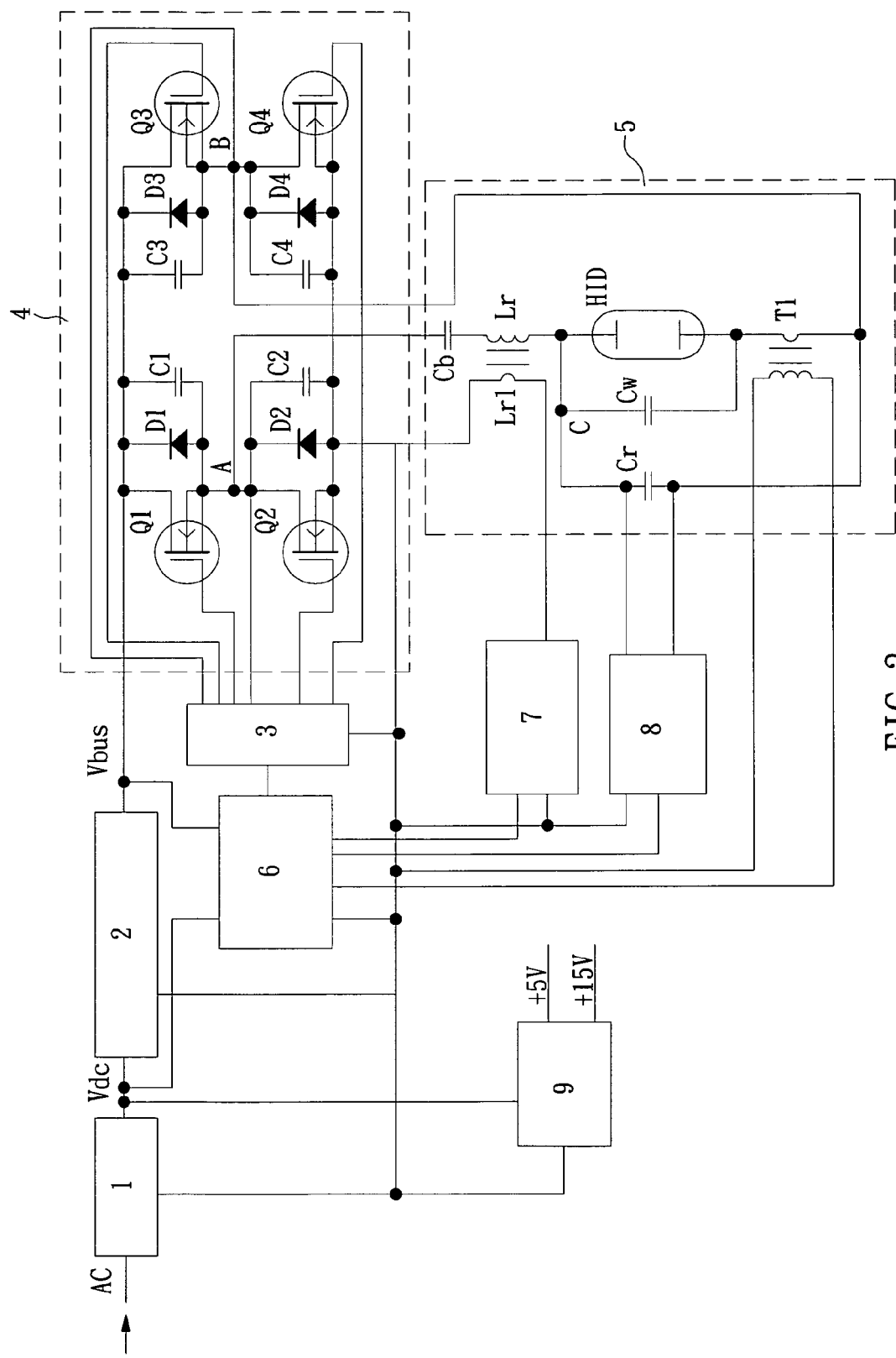
FIG. 3 is the schematic diagram of the electronic ballast of HID lamp that adopts full-bridge DC/AC as power output and includes all basic functional models. In the diagram, Crw=Cw//Cr, and Cb is greatly bigger than Crw.
Figure 4:
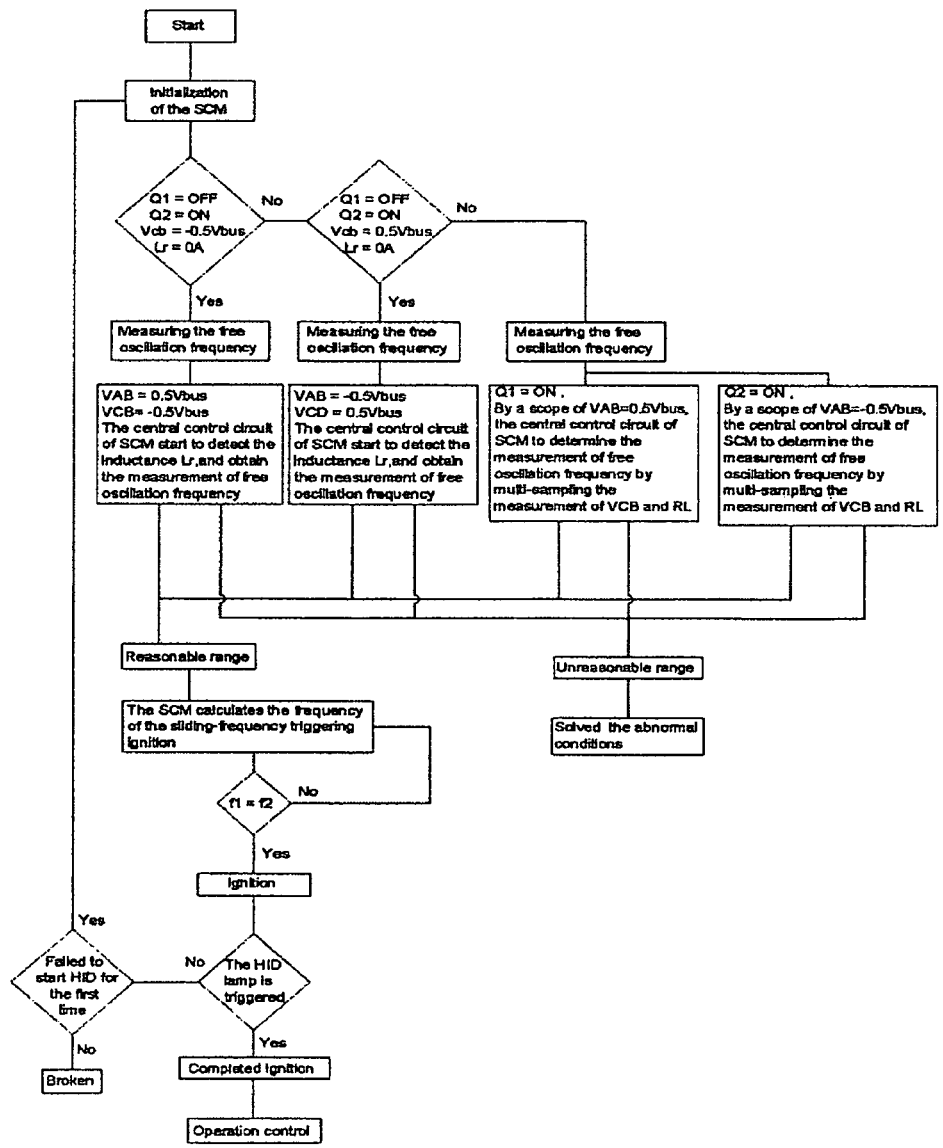
FIG. 4 inflow chart of an embodiment of a ballast operating sequence showing the different steps.

The steps of ignition are:

Take the half-bridge circuit shown in FIG. 2 as an example (same theory for full-bridge).

Step 1: Initialization of the SCM.

Set the internal control, register and input/output ports of the SCM, initialize the other functional circuits of the single-chip central controlling circuit (6), set the initiation status of the driving circuit (3) and switch off Q1 and Q2, and detect the make sure that the impulse DC voltage Vdc of the rectifying circuit (1), the output DV voltage Vbus of the Power factor correcting circuit (2) and the output voltage of the low-voltage power supply circuit (9) are within the normal range. After resetting, the middle point voltage of the passive bridge arm capacitor Cb1 and Cb2 VB=0.5Vbus.

Step 2: Initialization of the load loop.

Scheme 1: Negative voltage initialization of the capacitor Crw. Switch on Q2 and keep in this state for greatly longer than the free oscillation circle of the load loop within the allowed range, with the purpose of allowing voltage on the capacitor Crw VCB=−0.5Vbus and the current of the inductance Lr is basically zero upon completion of the initialization.

Scheme 2: Positive voltage initialization of the capacitor Crw. Switch on Q1 and keep in this state for greatly longer than the free oscillation circle of the load loop within the allowed range, with the purpose of allowing voltage on the capacitor Crw VCB=0.5Vbus and the current of the inductance Lr is basically zero upon completion of the initialization.

Scheme 3: Go to step 3 without carrying out any special load loop initialization operation.

Step 3: Measuring free oscillation frequency.

There are four schemes optional including scheme A that corresponds to scheme 1, scheme B that corresponds to scheme 2, and scheme C and D that correspond to scheme 3 of the initialization of the load loop:

Scheme A: switch off Q2 and switch on Q1 after a break, the load loop will enter a step change response process under an impulse action with a scope of VAB=0.5Vbus and under which the initial voltage on the capacitor Crw VCB=−0.5Vbus and the initial current of the inductance Lr is zero. The HID lamp (12) has high resistance since it is not ignited, and on future switching operation is carried out on Q1 and Q2, so the Q value of the loop is high, and the load loop starts to attenuate the free oscillation, whose frequency is just the free oscillation frequency of the load loop that contains different factors of change. Induce an impulse of completely the same frequency with the main loop of the oscillation on the sampling winding of the inductance Lr, and rapidly start the capturing function of the single-chip central controlling circuit (6) to detect and sample the change of the storage impulse, and then switch off Q1. The accurate free oscillation frequency of the load loop is gained through digital processing of the SCM. If the sampling impulse value of the free oscillation is not captured, or the frequency gained from the data processing exceeds the reasonable range, the load loop may be under abnormal conditions, which should be solved otherwise. The feature of this scheme is that the free oscillation current is superposed by two transiting processes, including the load loop zero state response that VAB=0.5Vbus and the load loop zero input response that VCB=−0.5Vbus. These two processes basically have the same frequency and phase, with large loop current resonance scope, and under the same condition, it can achieve good repetition of the measurement of the free oscillation current, which conveniences the capture of the valid sampling impulse.

Scheme B: switch off Q1 and switch on Q2 after a break, the load loop will enter a step change response process under an impulse action with a scope of VAB=−0.5Vbus and under which the initial voltage on the capacitor Crw VCB=0.5Vbus and the initial current of the inductance Lr is zero. The situation of the load loop starting to attenuate the free oscillation is basically the same with scheme A. It completes the measurement of the free oscillation frequency of the load loop with the method that is completely the same with scheme A. The feature of this scheme is that the free oscillation current is superposed by two transiting processes, including the load loop zero state response that VAB=−0.5Vbus and the load loop zero input response that VCB=0.5Vbus. These two processes basically have the same frequency and phase, with large loop current resonance scope, and under the same condition, it can achieve good repetition of the measurement of the free oscillation current, which conveniences the capture of the valid sampling impulse.

Scheme C: switch on Q1, the load loop will enter a step change response process under an impulse action with a scope of VAB=0.5Vbus and under which the initial voltage VBA on the capacitor Crw and the initial current of the inductance Lr are uncertain. It completes the measurement of the free oscillation frequency of the load loop with the method that is the same with scheme A. The feature of this scheme is that the process is very simple, however, as the initial voltage VBA on the capacitor Crw and the initial current of the inductance Lr are uncertain, under the same condition, the measured scope of the free oscillation current will be different, which increases the difficulty of capturing the valid sampling impulse.

Scheme D: switch on Q2, the load loop will enter a step change response process under an impulse action with a scope of VAB=−0.5Vbus and under which the initial voltage VBA on the capacitor Crw and the initiate current of the inductance Lr are uncertain. The method of measurement and the feature are the same with scheme C.

Step 4: The SCM calculates the starting frequency f1 and the ending frequency f2 of the sliding-frequency triggering ignition.

Step 5: Sliding-frequency triggering ignition.

Through driving circuit (3), the single-chip central controlling circuit (6) allows the inverting power output circuit (4) to output initial driving impulse at the frequency of f1, and regularly reduces the driving frequency by sliding to f2 under certain speed and step length to achieve sliding-frequency triggering ignition. In the process, the single-chip central controlling circuit (6) supervises the current and voltage of the HID lamp (12), and the sliding-frequency triggering ignition stops when the lamp is triggered. If the HID lamp (12) is not yet triggered when the driving frequency is at f2, or in the process the current and voltage of the HID lamp (12) exceed the normal value, the sliding-frequency triggering ignition stops. This may be due to the causes that the HID lamp (12) is in warm-up state, the tube is broken, the outputting wire or the lamp holder has defects, or the outputting wire is shorted out. In this case, repeat from step 2 "Initialization of the load loop" after a break. If the ignition is not successfully after several attempts, the SCM may be broken.

Step 6: operation control. After the lamp is triggered, the single-chip central controlling circuit (6) enters the lamp power control, sound resonance elimination control, and other input voltage operation state control such as supervision of input voltage, ballast temperature, etc.

In conclusion, with respect to the fatal defect that has been existing in the process of ignition of the electronic ballast of the high pressure gas charging lamp that adopts the sliding-frequency triggering ignition technology, this invention has analyzed the cause of the problem from the theory and found the solution to solve the problem. In its carrying out, the invention fully makes use of the reliable and flexible hardware control and the fast and powerful data processing ability of the SCM, based on the standard hardware topology structure that is widely used currently, and through simple and delicate driving control and capture processing, to safely, reliably, accurately and conveniently measure the free oscillation frequency of the load loop of the electronic ballast under the current environment and condition, and based on which the reliable and accurate sliding-frequency triggering ignition has been realized and the problem of reliability caused by the fatal defects of the electronic ballast of the high pressure gas charging lamp that adopts the sliding-frequency triggering ignition technology has been solved, with the additional cost of only a chip SCM, so this invention has far-reaching significance in accelerating the wide application of the ballast of the high pressure gas charging lamp that has evident advantages in energy saving and environment protection to compare with the inductive ballast.

The invention claimed is:

1. An adaptive sliding-frequency triggering ignition method for electronic ballast of high pressure gas discharge lamp, comprising the steps of:
    Measuring an accurate value of free oscillation frequency of a load loop of the ballast by using a single-chip machine (SCM) before the sliding-frequency triggering ignition; and
    calculating the starting frequency and ending frequency of the sliding-frequency triggering ignition according to the measured accurate value.

2. An adaptive sliding-frequency triggering ignition method for electronic ballast of high pressure gas discharge lamp as set forth in claim 1, wherein: if a circuit topology of the ballast belongs to half-bridge circuit, the step of measuring the free oscillation frequency is: switching off one of switch tubes Q1 and Q2 and switching on another of the switch tubes after a break, so that the load loop enters a step change transition phase under an impulse action with a scope of VAB=0.5Vbus, then the loop starts to attenuate the free oscillation, and induce an impulse of completely the same frequency with a main loop of the oscillation on the sampling winding of an inductance Lr, and rapidly start the capturing function of a central control circuit of the SCM to detect and sample the change of a storage impulse, and then switch off Q1 or Q2 correspondingly and the accurate free oscillation frequency of the load loop of the ballast is gained through digital processing of the SCM.

3. An adaptive sliding-frequency triggering ignition method for electronic ballast of high pressure gas discharge lamp as set forth in claim 2, wherein: switching off Q1 or Q2 correspondingly before executing the abovementioned step for measuring the free oscillation frequency, and switching on Q2 or Q1 after a break, make sure the time in this state is sufficient enough to make a voltage on capacitor Crw VCB=−0.5Vbus and a current of the inductance basically zero before starting measuring.

4. An adaptive sliding-frequency triggering ignition method for electronic ballast of high pressure gas discharge lamp as set forth in claim 1, wherein: If a circuit topology of the ballast belongs to full-bridge circuit, the step of measuring the free oscillation frequency can also be: switching off Q1 and Q4, and switching on Q2 and Q3 after a break, so that the load loop enters a transition phase that VAB=−Vbas, then the loop starts to attenuate the free oscillation, and induce an impulse of completely the same frequency with a main loop of the oscillation on the sampling winding of an inductance Lr, and rapidly start the capturing function of a central control circuit of the SCM to detect and sample the change of a storage impulse, and then switch off Q2 and Q3 and the accurate free oscillation frequency of the load loop of the ballast is gained through digital processing of the SCM.

5. An adaptive sliding-frequency triggering ignition method for electronic ballast of high pressure gas discharge lamp as set forth in claim 4, wherein: switching off Q2 and Q3 before executing the abovementioned step for measuring the free oscillation frequency, and switching on Q1 and Q4 after a break, make sure the time in this state is sufficient enough to make a voltage on capacitor Crw VCB=Vbus and a current of the of the inductance basically zero before starting measuring.

6. An adaptive sliding-frequency triggering ignition method for electronic ballast of high pressure gas discharge lamp as set forth in claim 1, wherein: If a circuit topology of the ballast belongs to full-bridge circuit, the step of measuring the free oscillation frequency is:
    switching off Q2 and Q3, and switching on Q1 and Q4 after a break, so that the load loop enters a transition phase that VAB=Vbus, then the loop starts to attenuate the free oscillation, and induce an impulse of completely the same frequency with a main loop of the oscillation on the sampling winding of an inductance Lr, and rapidly start the capturing function of a central control circuit of the SCM to detect and sample the change of the storage impulse, and then switch off Q1 and Q4 and the accurate free oscillation frequency of the load loop of the ballast is gained through digital processing of the SCM.

7. An adaptive sliding-frequency triggering ignition method for electronic ballast of high pressure gas discharge lamp as set forth in claim 6, wherein: switching off Q1 and Q4 before executing the abovementioned step for measuring the free oscillation frequency, and switching on Q2 and Q3 after a break, make sure the time in this state is sufficient enough to make a voltage on capacitor Crw VCB=−Vbus and a current of the inductance is basically zero before starting measuring.

* * * * *